US010287414B2

(12) United States Patent
Ceulemans et al.

(10) Patent No.: US 10,287,414 B2
(45) Date of Patent: May 14, 2019

(54) BORON COMPOUND SUSPENSION

(75) Inventors: Philippe Ceulemans, Turnhout (BE); Olivier Ceulemans, Oud-Turnhout (BE)

(73) Assignee: C-IP S.A., Luxembourg (LU)

( * ) Notice: Subject to any disclaimer, the term of this patent is extended or adjusted under 35 U.S.C. 154(b) by 971 days.

(21) Appl. No.: 13/810,927

(22) PCT Filed: Jul. 19, 2011

(86) PCT No.: PCT/IB2011/053219
§ 371 (c)(1),
(2), (4) Date: May 21, 2013

(87) PCT Pub. No.: WO2012/011056
PCT Pub. Date: Jan. 26, 2012

(65) Prior Publication Data
US 2013/0230605 A1 Sep. 5, 2013

(30) Foreign Application Priority Data

Jul. 20, 2010 (EP) .................................... 10170187
May 10, 2011 (BE) .................................. 2011/0284

(51) Int. Cl.
*C05D 9/02* (2006.01)
*C08K 3/38* (2006.01)
*C08L 1/02* (2006.01)
*C08L 1/28* (2006.01)
*C08L 5/00* (2006.01)
*G21C 5/12* (2006.01)
*C01B 35/02* (2006.01)
*C01B 35/10* (2006.01)
*C01B 35/12* (2006.01)
*C08L 97/02* (2006.01)

(52) U.S. Cl.
CPC .............. *C08K 3/38* (2013.01); *C01B 35/023* (2013.01); *C01B 35/1036* (2013.01); *C01B 35/12* (2013.01); *C01B 35/121* (2013.01); *C01B 35/122* (2013.01); *C05D 9/02* (2013.01); *C08L 1/02* (2013.01); *C08L 1/286* (2013.01); *C08L 5/00* (2013.01); *C08L 97/02* (2013.01); *G21C 5/12* (2013.01)

(58) Field of Classification Search
CPC ....................................................... C08K 3/38
See application file for complete search history.

(56) References Cited

U.S. PATENT DOCUMENTS

| 4,332,609 A | | 6/1982 | Ott |
| 4,572,733 A | | 2/1986 | Howard |
| 4,652,446 A | * | 3/1987 | Dettmar ................. A61K 31/78 424/690 |
| 5,129,946 A | * | 7/1992 | Evans .................... A01N 59/14 106/162.5 |
| 5,288,493 A | | 2/1994 | Martino et al. |
| 5,645,825 A | | 7/1997 | Hillebrand et al. |
| 5,658,867 A | | 8/1997 | Pancheri et al. |
| 6,455,100 B1 | | 9/2002 | Heimann |
| 7,186,415 B1 | | 3/2007 | Gers-Barlag |
| 2002/0197292 A1 | | 12/2002 | Fowler |
| 2011/0135743 A1 | * | 6/2011 | Chowhan ............. A61K 9/0048 424/499 |

FOREIGN PATENT DOCUMENTS

| AU | 574389 B2 * | 7/1988 | ............. A01N 59/14 |
| DE | 10214058 A | 10/2003 | |
| EP | 0550280 X | 7/1993 | |
| GB | 1297743 A | 11/1972 | |
| WO | 9902125 A | 1/1999 | |
| WO | 9920565 A | 4/1999 | |
| WO | 0023397 | 4/2000 | |
| WO | 2006021782 | 3/2006 | |
| WO | 2009069006 | 6/2009 | |
| WO | 2011089053 | 7/2011 | |

OTHER PUBLICATIONS

TDS-222, Molecular Weight of Carbopol and Pemulen Polymers, Technical Data Sheet, The Lubrizol Corporation, Jul. 10, 2008, pp. 1-3.*
Wikipedia Entry for Boric Acid, dated Dec. 27, 2015.
Applied Chemicals Anwendungs Technik, Technische Information, material safety data sheet for CIBA DISPEX dispersing agent. Sep. 22, 2006. acat.com.
Chhabra, R.P. Non-Newtonian Fluids: An Introduction. Rheology of Complex Fluids. 2010. pp. 8, 9, 16. Springer. New York, New York.

* cited by examiner

*Primary Examiner* — Michael B. Pallay
(74) *Attorney, Agent, or Firm* — SRIPLaw, P.A.

(57) ABSTRACT

A suspension of a boron containing compound in the form of crystals, powder or granulate in a solvent which contain a carbomer as dispersant. This suspension is very stable, even at high concentrations, and exhibits favourable non-Newtonian viscosity behavior, which makes it suitable in a number of applications, such as for the control of fission reactions with the generation of electric power from nuclear energy.

24 Claims, 1 Drawing Sheet

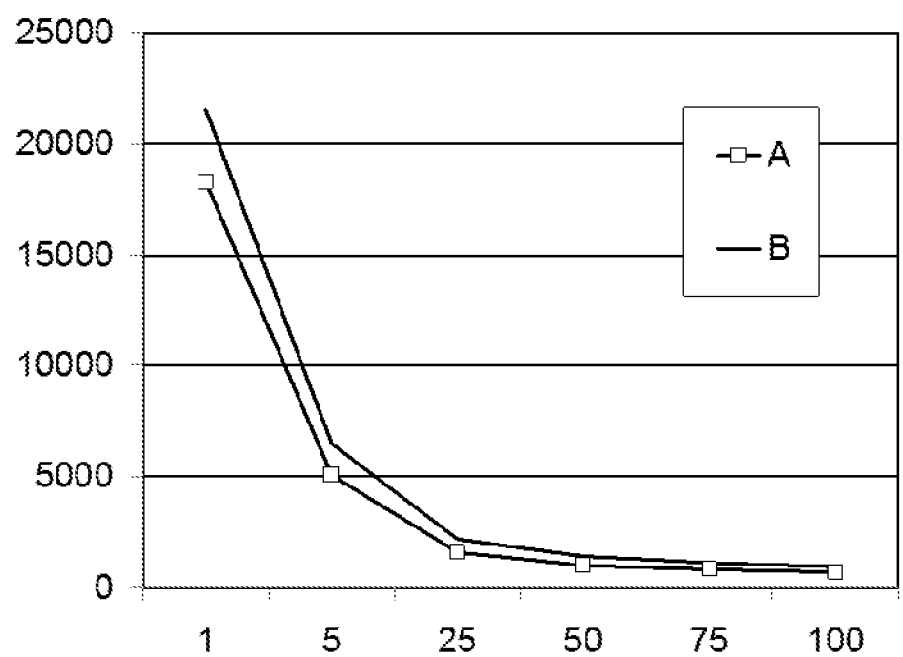

BORON COMPOUND SUSPENSION

CROSS-REFERENCE TO RELATED APPLICATIONS

This application is the entry into the United States National Stage of PCT Application Number PCT/IB2011/053219 filed Jul. 19, 2011 and claims priority from European Patent Application Number EP/10170187.8 filed Jul. 20, 2010, and Belgium Patent Application Number 2011/0284 filed May 10, 2011, the entirety of all three of which are hereby incorporated by reference.

FIELD OF THE INVENTION

The present invention relates to a suspension of a boron containing compound, such as a boric salt or boric acid or mixtures thereof, in the form of crystals, a powder or a granulate, in a solvent or fluid. The invention further relates to the use of the suspension of the boron containing compound in a number of applications, such as for the absorption of neutrons generated by nuclear fission reactions, such as with the commercial generation of electric power from nuclear energy, for instance in order to control or stop the reaction.

BACKGROUND OF THE INVENTION

Many boron containing compounds are boric salts. Many different kind of boric salts exist. The boric salts typically used in the industry are those based on sodium or potassium. Sodium borate in its many different forms is a compound with many applications in various fields of industry. Sodium tetraborate pentahydrate ($Na_2B_4O_7.5H_2O$) is for instance used in large quantities in the production of insulation fiberglass and of sodium perborate bleach. Sodium tetraborate decahydrate ($Na_2B_4O_7.10H_2O$) is found as part of adhesives and in anti-corrosion systems. Sodium borates are also used as flux when soldering silver or gold, and in combination with ammonium chloride for the welding of iron containing metals. They are also used as flame retardant additives for many plastics and rubber materials. In many detergents, laundry detergents, cleaning agents and bleaching products, sodium perborate serves as the source of active oxygen.

Boric acid (also know as borate acid, orthoboric acid or Acidum Boricum) $H_3BO_3$ is used in the production of textile fiberglass and flatscreen monitors. It also has antiseptic, antifungal and antiviral properties and is for those reasons often used as a disinfectant for swimming pool water. Boric acid is conventionally also used as insecticide, in particular against ants, fleas and cockroaches. In nuclear power plants, it is used to absorb neutrons, by which the rate at which nuclear fission occurs may be reduced. It is further used as a flame retardant and as a precursor for other chemical compounds. Boric acid is offered in the form of colourless crystals or as a white powder, and dissolves slowly in water. When it occurs as a mineral, it may also be called sassolite.

Boric acid and borates such as borax pentahydrate, sodium pentaborate decahydrate, sodium metaborate octahydrate, potassium tetraborate tetrahydrate, potassium pentaborate octahydrate and particularly borax decahydrate are compounds which are used commercially very broadly, such as as raw material for the production of boron containing products, or as ingredients of compositions of which they themselves are the main or a partial component. Products containing boron may for instance be cosmetics, pharmaceuticals, products for treating leather and textiles, detergents and adhesives, more specifically starch and casein adhesives.

The use of these boron containing compounds as raw material or as a component of a mixture, often comprises their addition as a solid, and in many processes this addition is performed in a continuous manner. Current methods to transport boric acid or borates in a solid form comprise automatic dosing systems such as a hopper or a screw feeder. In the industry a common problem is that the solid boron containing compound forms lumps, which may clog up the supply or cause an uneven distribution of the compound. The formation of lumps is often associated with the hydroscopic nature of many boron containing compounds, often combined with the moisture which may be present in the composition to which the boron containing compound is added.

Sodium borate, as most boron containing compounds, is most typically known as a powder. There are however certain hazards associated with the use of boron containing compounds, because several of those compounds are associated with particular dangers or possible health problems with humans. When transporting and handling boron containing compounds in a solid form, the risk occurs that the compound comes in contact with the skin or enters the respiratory tract. Microparticles which by use as a powder may become blown up may then become absorbed into the respiratory system. They may also irritate the eyes and cause allergic reactions. There is therefore a need for reducing the use of boron containing compounds in the form of a powder.

Boron containing compounds, such as sodium borate and boric acid, are materials which are widely used in the industry, and there is therefore a major need for a composition comprising boron containing compounds which are safer for the people handling them. Liquids are usually more easy to transport, and safer than powders because they are less readily blown up. Sodium borate is like boric acid and other boron containing compounds soluble in water and in other solvents, but usually at a rather low solubility. Dissolving a particular amount of boron containing compound in for instance water may therefore require large volumes of liquid, which then become difficult to transport.

It is the target of the present invention to offer a composition in which boron containing compounds may be transported and handled in a safer and more efficient manner.

The present invention aims to obviate or at least mitigate the above described problem and/or to provide improvements generally.

SUMMARY OF THE INVENTION

The inventor arrived at the idea to bring the boron containing compound or compounds in suspension.

The invention therefore provides a suspension of a boron containing compound in a polar solvent, preferably water, characterised in that the suspension also comprises a carbomer, preferably in an amount which is sufficient to keep the boron containing compound in suspension, and more preferably to keep the suspension stable over a longer period.

With a suspension of a boron containing compound, borate salts or boric acid, the compound itself dissolves only very partially, and remains present in the liquid primarily in the form of particles. When mixing large quantities of powder or granulate of boron containing compounds in water, the compound does not readily go into suspension. The inventor surprisingly discovered that a stable suspension of a boron containing compound in a fluid or solvent may indeed be obtained when a carbomer is added to the suspension. In this way large quantities of boron containing compounds may be brought into suspension in relatively small volumes of liquid.

Such a suspension brings the advantage that large quantities of boron containing compounds may be transported in a compact and safe manner.

A further advantage is that the boron containing compound particles do not clot up, which does occur when the compound is transported as a powder. Thereby blockage of conduits through which boron containing compounds are transported is avoided.

The inventors further found that the carbomer influences the viscosity of the suspension, and converts it into a non-Newtonian fluid, i.e. a fluid which exhibits non-Newtonian viscosity and/or flow behaviour. On the one hand, the viscosity of the suspension becomes relatively high with low shear forces, which in rest impairs the movement of the particles and improves the stability of the suspension advantageously. On the other hand the viscosity of the suspension becomes low with high shear forces, which improves the pumpability of the suspension advantageously because it requires little energy, which then primarily improves the handling of the suspension advantageously.

This flow behaviour allows for an easy transfer of the suspension using common pumps, which is very handy for preparing diluted suspensions. The concentration of the boron containing compound in the suspension may therefore readily be adjusted to the needs, and this in a very wide range, for example from 4,000 to 500,000 ppm weight of the boron containing compound.

The suspension according to the present invention may thus comprise a high concentration of the boron containing compound in a stable way, whereby the compound is maintained in the liquid because it does not settle and also may not be blown up as a powder, yet the suspension is at the same time also readily pumpable.

In another embodiment, the present invention provides for the use of the suspension according to the present invention for the absorption of neutrons, whereby the suspension preferably contains at least 10% boron-10, more preferably at least 12% boron-10, even more preferably at least 14% boron-10, preferably at least 16% boron-10, more preferably at least 18% boron-10 and yet more preferably at least 19% boron-10, whereby the rest of the boron is primarily present as boron-11. In this application, a kind of boron containing compound may be used which has been enriched in an isotope, such as wherein the presence of the boron-10 isotope has been increased compared to the ratio boron-10 relative to boron-11 as it occurs in nature.

In yet another embodiment, the invention provides the use of the suspension according to the present invention for the production of glass, for instance glass fibre, preferably borosilicate glass.

In again another embodiment, the invention provides the use of the suspension according to the present invention for the production of a fertilizer.

In yet another embodiment, the invention provides the use of the suspension according to the present invention for the production of a cosmetic product or a pharmaceutical, for instance as an antiseptic, a viscosity regulator or a pH regulator, or as a stabiliser.

In again another embodiment, the invention provides the use of the suspension according to the present invention as a biocide, an insecticide or a flame retardant, for example in the processing of natural products such as wood, latex rubber and/or leather.

A use may be in a concentrated form or after dilution.

BRIEF DESCRIPTION OF THE DRAWINGS

The single figure shows the viscosity behaviour of two suspensions according to the invention in function of shear rate.

DETAILED DESCRIPTION OF THE INVENTION

Preferably the boron containing compound which is brought into suspension is selected from the group consisting of boric acid, a sodium or potassium polyborate, it its hydrate or non-hydrate form, boric acid anhydride, sodium or potassium metaborate, preferably a sodium tetraborate, pentaborate or octaborate, more preferably sodium tetraborate decahydrate or borax ($Na_2B_4O_7.10H_2O$), kernite ($Na_2B_4O_7.4H_2O$), colemanite ($Ca_2B_6O_{11}.10H_2O$) and mixtures thereof.

In the context of the present invention it is understood that a part of the boron containing compound may go into solution. The suspension therefore comprises an amount of boron containing compound or compounds which is above the solubility of the compound or compounds in the particular solvent, usually measured at 25° C. or, when not specified, at room temperature, for which usually 23° C. is used. Borax dehydrate for example has a solubility in water of about 4.71% wt.

The inventors have found that it advantageous to use the boron containing compound as a granulate, as compared to the use of the same compound as a powder. The inventors have found that the granulate is easier to work with, and generates less dust in the workshop. This allows to keep the workshop cleaner and makes the provisions simpler for assuring a good industrial hygiene for the operations personnel. The granulate particles also are found to wet more readily, such that the granulate more readily comes into suspension.

The inventors preferably use a form of granulate having a particle size distribution which by sieving shows at most 20.00% wt of particles passing through a sieve with openings of 0.063 mm, more preferably at most 10.00% wt, even more preferably at most 6.00% wt and preferably at most 4.00% wt. Additionally by preference at most 10.00% wt is retained in a sieve with openings of 1.000 mm, preferably at most 6.00% wt, more preferably at most 4.00% wt, typically even at most 2.00% wt and if desired not more than 1.00% wt. Preferably as alternative may be chosen a granulate with a sieve specification that only at most 0.1% wt is retained with a US Standard sieve No 8 (2.38 mm sieve opening), more preferably in addition at most 2.0% wt with a US Standard sieve No 20 (0.841 mm sieve opening).

Commercially available and suitable boron containing compounds are for instance obtainable from Etimine SA, a subsidiary of Eti Mine, also known as Eti Mine Works, a Turkish company, for example under the trademark ENTIMADEN®, and from Borax Company, a subsidiary of Rio Tinto, an international group with decision centres in Great Britain and in Australia. Borax Company may use for boric acid the trademark Optibor® and offers boron containing compounds with the additional annotation SQ, for instance boric acid but also potassium tetraborate, which are particularly intended for the nuclear industry. In this application, the inventors prefer to use a larger granulate, such as the one according to the specification using the US Standard sieve No. 8, but which contains lower quantities of particular impurities, such as for instance at most 3.0 ppm $SO_4$ and/or at most 0.4 ppm Cl, and/or at most 2.0 ppm Fe, always expressed on a weight basis, and in particular applicable to boric acid. Other granulates of boron containing compounds may comprise, if desired, at most 500 ppm $SO_4$, preferably at most 350 ppm $SO_4$, more preferably at most 70 ppm $SO_4$, at most 50 ppm Cl, preferably at most 18 ppm Cl, more preferably at most 10 ppm Cl, and/or at most 10 ppm Fe, preferably at most 7 ppm Fe and more preferably at most 6 ppm Fe, always expressed on a weight basis.

In the context of the present invention, a carbomer is defined as a water soluble polymer comprising as a monomer an unsaturated acid, or a derivative thereof such as an ester or amide, which may preferably be represented by the formula $CH_2=CR-CO-G$ or $CH_2=CR-COO-A^1$. In this formula, R represents a substituent selected from the group of H, monovalent alkyl, aryl or alkylaryl radicals and monovalent cyclo alkyl radicals, although H as the substituent is preferred, with $CH_3$ a very acceptable second choice. Nevertheless, R may also be selected from the group of alkyl, alkoxy, haloalkyl, cyanoalkyl and similar groups containing 1 to 9 carbon atoms. G may represent an amine group $-NL_2$, such as $-NH_2$, in which case the monomer is preferably acrylamide or methacrylamide. $A^1$ and/or L may independently from R and G represent a substituent selected from the group of H, monovalent alkyl, aryl or alkylaryl radicals and monovalent cyclo alkyl radicals, although H as the substituent is preferred, in which case the monomer may be an unsaturated carboxylic acid. Nevertheless, $A^1$ and/or L may also be selected from the group of alkyl, alkoxy, haloalkyl, cyanoalkyl and similar groups containing 1 to 35 carbon atoms.

The carbomer preferably is primarily or entirely a homopolymer of (meth)acrylic acid or methacrylic acid, or a copolymer of mixtures thereof, and which may be cross-linked.

Optionally, other copolymers may be used. Further to a monocarboxylic acid and/or its ester, use may also be made of a polycarboxylic acid and/or its ester as comonomer, such as an acrylate or methacrylate, and optionally an alkyl alkoxylated ester, such as an alkyl alkoxylated acrylate or methacrylate, which may be a $C_{15}$-$C_{35}$ alkyl alkoxylated acrylate or methacrylate. In particular, olefinically unsaturated carboxylic acids containing at least one carbon-carbon olefinic double bond, and at least one carboxyl group are preferred, and/or esters thereof. Suitable examples include acrylic acids, in particular acrylic acid, methacrylic acid, ethacrylic acid, alpha-cyano acrylic acid, beta-methylacrylic acid (crotonic acid), alpha-phenyl acrylic acid, beta-acryloxy propionic acid, cinnamic acid, p-chloro cinnamic acid, 1-carboxy-4-phenyl-1,3-butadiene, 3-acrylamido-3-methylbutanoic acid, itaconic acid, citraconic acid, mesaconic acid, glutaconic acid, aconitic acid, maleic acid, fumaric acid, and tricarboxy ethylene. Examples of suitable polycarboxylic acids include acid anhydrides, such as maleic anhydride, wherein the anhydride group is formed by the elimination of one molecule of water from two carboxyl groups located on the same carboxylic acid molecule. However, acrylic and methacrylic acid are preferred.

The alkyl alkoxylated acrylate or methacrylate is a hydrophobic co-monomer. The hydrophobic co-monomer will usually be an ester of an acid or a mixture of two or more thereof, and it may include one of the various known (meth)acrylates or (meth)acrylamides.

The alkyl group of the alkyl alkoxylated (meth)acrylate may contain 5-30 carbon atoms, preferably 15-30, more preferably 20-25 carbon atoms. The alkyl structure may contain primary, secondary, or tertiary carbon configurations. Examples of suitable alkyl alkoxylated acrylates include methoxymethyl acrylate, methoxyethyl acrylate, ethoxyethyl acrylate, butoxyethyl acrylate, or ethoxypropyl acrylate. The alkyl structure may also contain a phenyl group, which may be substituted, and suitable alkyl structures are octylphenyl, nonylphenyl and dodecylphenyl structures, of which the alkoxylated derivatives, such as those containing 1-12 ethoxy and/or propoxy groups are readily commercially available.

The monomers in the carbomer may be octadecyl acrylate, behenyl acrylate, dodecyl acrylate, hexadecyl acrylate and the like; and cyano derivatives thereof; methacrylates such as steryl methacrylate, methyl methacrylate, ethyl methacrylate, octyl methacrylate, isopropyl methacrylate, 2-ethylhexyl methacrylate, n-hexyl methacrylate, octadecyl methacrylate, behenyl methacrylate, dodecyl methacrylate, hexadecylmethacrylate, and the like. Mixtures of two or three or more long chain acrylic esters may successfully be polymerized with one of the carboxylic acid and/or ester monomers. The preferred hydrophobic monomers are the linear, long chain hydrophobic monomers wherein the alkyl group contains at least 12 carbon atoms, such as stearyl methacrylate, hexadecyl methacrylate, and behenyl methacrylate. Optionally, a complex hydrophobe may be utilized containing polyalkyleneoxide branches capped with hydrophobic alkyl or alkylaryl groups.

For a (meth)acrylic acid ester of an alkoxylated alcohol the alkyl group is typically a $C_8$-$C_{24}$ alkyl; alkylaryl, including alkylphenyl groups such as octylphenyl and nonylphenyl; or the residue of a polycyclic hydrocarbyl compound such as lanolin or cholesterol. Suitable alkyl groups include tridecyl, myristyl, pentadecyl, cetyl, palmityl, stearyl, eicosyl, and behenyl or docosyl or mixtures thereof. Such a suitable monomer mixture may for instance originate from the alkoxylation of a mixture of lauryl, stearyl, cetyl, and palmityl alcohols.

The above-described carbomer (co)polymer is preferably cross-linked. As cross-linking agent, various polyunsaturated monomers may be utilized, whereby either a partially or substantially cross-linked three-dimensional network is obtained. Suitable cross-linking agents include allyl ethers of sucrose or pentaerythritol, or other polyunsaturated monomers for example diallyl esters, dimethallyl ethers, allyl or methallyl acrylates and acrylamides, tetraallyl tin, tetravinyl silane, polyalkenyl methanes, diacrylates and dimethacrylates, divinyl compounds such as divinyl benzene, divinyl glycol, polyallyl phosphate, diallyloxy compounds, phosphite esters, and the like. Typical polyunsaturated monomers include di, tri, or tetra, penta, or hexa-allyl sucrose; di, tri, or tetra-allyl pentaerythritol; diallylphthalate, diallyl itaconate, diallyl fumarate, diallyl maleate, divinylbenzene, allyl methacrylate, allyl citrate, ethylene glycol di(meth)acrylate, trimethylolpropane triacrylate, 1,6-hexanediol diacrylate, pentaerythritol triacrylate, tetramethylene diethacrylate, tetramethylene diacrylate, ethylene diacrylate, ethylene dimethacrylate, triethylene glycol methacrylate, methylene bisacrylamide, and the like. Castor oils or polyols, esterified with ethylenically unsaturated carboxylic acid and the like may also be used. Preferred crosslinking agents include allyl pentaerythritol, allyl sucrose, trimethylolpropane allyl ether, and divinyl glycol.

A preferred carbomer according to the present invention may be a polymer having the formula (I)

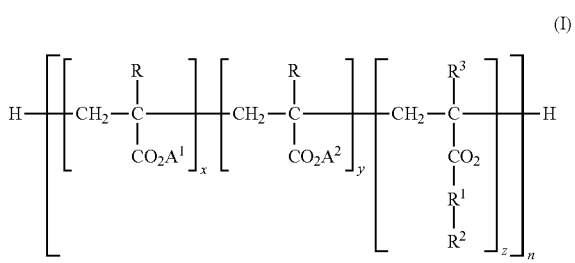

(I)

In another embodiment the carbomer according to the present invention is a polymer having the formula (II).

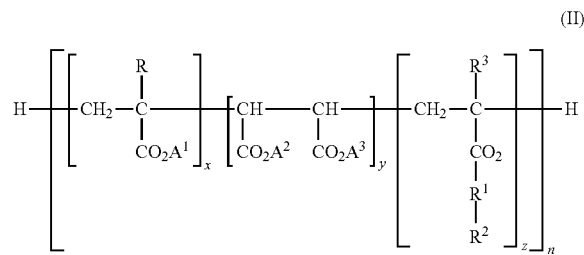

(II)

In formulae (I) and (II), z may be 0 or 1; if z is 1, (x+y):z may be from 4:1 to 1,000:1, preferably from 6:1 to 250:1; in which the monomer units may be in random order, y preferably being from 0 up to a maximum equal to the value of x; n is at least 1; and further R has the meaning specified herein before;

$R^1$ represents from 1 to 50 independently selected alkyleneoxy groups preferably ethylene oxide and/or propylene oxide groups;

$R^2$ represents a C4-C35 hydrocarbon group; preferably saturated alkyl but possibly containing a phenyl group, in which case we prefer $R^2$ to represent an octyl phenol, a nonyl phenyl or a dodecyl phenyl group;

$R^3$ represents hydrogen or C1-C4 alkyl, preferably H or $CH_3$;

$A^1$, $A^2$ and $A^3$ are independently selected from hydrogen and alkyl groups, preferably C1-C4 alkyl groups.

In the formulae (I) and (II), any of the groups —O-A1, —O-A2 or —O-A3 may also be replaced by an amine group, typically having the formula —$NL_2$, whereby L has the meaning as specified herein before.

For the production of the carbomer, any suitable polymerization technique may be employed. We prefer to use a free-radical polymerization technique such as those known in the art, e.g. such as being disclosed in Kirk-Othmer, 5th Edition, Wiley, in volume 20.

In an embodiment of the present invention, the carbomer has an average molecular weight Mn in the range of 20,000 to 5,000,000, preferably 35,000 to 3,000,000, more preferably 50,000 to 2,000,000, even more preferably 70,000 to 1,000,000, yet more preferably 80,000 to 500,000, even more preferably 90,000 to 200,000 and most preferably at most 130,000, as measured by GPC. The carbomer is preferably cross-linked. The molecular weight is preferably determined by Gel Permeation Chromatography (GPC) with the carbomer dissolved in dimethylacetamide (DMA) and on an analytical system which is calibrated with polymethylmethacrylate reference standards. More preferably the carbomer analysed as such also has, always relative to DMA, an Mw in the range of 50,000 to 5,000,000, preferably 100,000 to 3,000,000, more preferably 130,000 to 2,000,000, and even more preferably 150,000 to 200,000. The polydispersity of the copolymer is preferably in the range of 1-5, more preferably from 1.1 to 4.0, even more preferably from 1.2 to 3.0, yet more preferably from 1.3 to 2.0, even more preferably from 1.4 to 1.7 and even more preferably at most 1.7, determined by the same method.

The above described effects are particularly pronounced with a carbomer additive which comprises an acrylic acid homopolymer, in particular an α,β unsaturated monobasic acrylic acid having 3-5 carbon atoms, which corresponds to the formula III:

$CH_2$=CR—COOH    formula III in which R represents a substituent selected from the group of H, monovalent alkyl, aryl or alkylaryl residues and monovalent cycloalkyl residues, though H as the substituent has the preference. Nevertheless, R may also be selected from the group of alkyl, preferably methyl, alkoxy, haloalkyl, cyanoalkyl and similar groups having 1 to 9 carbon atoms.

Homopolymers of acrylic acid and methacrylic acid have the preference, because they are readily commercially obtainable at an economically acceptable price and because they cause the desired change of viscosity.

A preferred viscosity ratio between a first situation whereby no pressure or shear forces are applied to the composition according to the present invention and a second situation whereby the composition is subjected to pressure or shear forces, is obtained with an additive wherein the homopolymers are cross-linked with a cross-linking agent which is a polyfunctional monomer having at least two terminal vinyl $CH_2$=C groups, and with a molecular weight as indicated above, or also between 0.05-100, preferably between 0.5-10, more preferably between 1-5×10 exp 9 Dalton, the additive having the property that at high shear forces the viscosity reduces, and the viscosity increasing immediately when the shear forces are removed.

Preferably use is made of a cross-linking agent which is a polyalkenyl polyether, in particular allyl pentaerithritol. Other suitable cross-linking agents are polyfunctional monomers having at least two terminal vinyl $CH_2$=C groups, such as for instance in butadiene, isoprene, divinyl benzene, divinyl naphthalene, allyl acrylates, and the like. Preferred cross-linking agents are those which contain an alkenyl group wherein an olefinic double bound is connected to a terminal methylene group. Cross linking agents which are particularly preferred are polyethers having on average two or more alkenyl ether groups per molecule. Other suitable cross-linking agents comprise diallyl esters, dimethylallyl ethers, allyl or methallyl acrylates, acrylamides. Examples thereof are allyl pentaerythritol, allyl saccharose, trimethylolpropane triacrylate, 1,6-hexanediol diacrylate, trimethylolpropane propane diallylether, pentaerythritol triacrylate and the like.

The above cited effects were also observed with an additive which comprises a copolymer, whereby the acrylic acid of the formula III is copolymerized with at least one alkylacrylate having formula IV:

$CH_2$=CR'—CO—OR"    formula IV whereby R' is selected from the group consisting of H, methyl, ethyl and R" is a C10-C30 alkyl group, preferably a C10-C20 group, the copolymers preferably being cross-linked with a cross-linking agent which is a polyfunctional monomer having at least two terminal vinyl $CH_2$=C groups, as described above.

Representative acrylates of formula IV are methyl acrylate, ethyl acrylate, propyl acrylate, butyl acrylate, methyl methacrylate, methyl ethacrylate, octyl acrylate, lauryl acrylate, stearyl acrylate, behenyl acrylate, and the corresponding methacrylates. Suitable copolymers comprise copolymers of a mixture of two or more of the listed compounds with acrylic acid of formula III. Other comonomers comprise acrylonitriles, olefinic unsaturated nitriles, preferably those having 3-10 carbon atoms, for example acrylonitrile and methacrylonitrile; mono-olefinically unsaturated acrylamides, such as acrylamide en methacrylamide, N-alkylolamides of α,β-olefinically unsaturated carboxylica acids, including those having 4-10 carbon atoms, preferably N-methylol-methacrylamide.

Suitable commercially available products for use as the carbomer in the context of the present invention are available from Sigma Chemical Company, such as the products which are offered under the tradename Polygel®, e.g. Polygel® CB 3V, from Rohm & Haas, e.g. the products offered under the tradename Acusol®, from Noveon or Lubrizol, for example products offered under de trademarks Pemulen™ and/or Carbopol®, such as Carbopol 674 or 981, Carbopol ETD 2050, or Novethix® L-10, from Wako Pure Chemical Industries in Japan, or from Allied Colloids from Great-Britain, such as Salcare®, or the products offered under the trademark Flosperse™ by SNF Floerger. The carbomer may be obtained as a solid powder, such as Carbopol 674 or Polygel CB-3V, but may also be obtained as liquid dispersions, such as Polygel W400 or W301 Polygel or Polygel DR. The liquid forms are easier to process, because they do not require high shear mixing, which is strongly preferred for the dissolving of a powder carbomer. Novethix L-10 is discussed in great detail in our copending patent application PCT/EP2010/053051.

In an embodiment of the present invention, the carbomer comprises a homopolymer of an α,β unsaturated monobasic acrylic acid having 3-5 carbon atoms, which corresponds to the formula III:

$$CH_2=CR-COOH \qquad \text{formula III}$$

in which R represents a substituent selected from the group of H, monovalent alkyl, aryl or alkylaryl residues and monovalent cycloalkyl residues, alkoxy, haloalkyl, cyanoalkyl having 1 to 9 carbon atoms, the homopolymers preferably being cross-linked with a cross-linking agent which preferably is a monomer having at least two terminal vinyl $CH_2=C$ groups.

In another embodiment of the present invention the carbomer comprises a copolymer of
(i) an α,β-unsaturated monobasic acrylic acid, which corresponds to the formula III with 3-5 carbon atoms:

$$CH_2=CR-COOH \qquad \text{formula III}$$

whereby R is a substituent selected from the Group of H, monovalent alkyl, aryl, alkylaryl resten, monovalente cycloalkyl residues, alkoxy, haloalkyl, cyanoalkyl having 1 to 9 carbon atoms, with
(ii) at least one alkyl acrylate represented by formula IV $$CH_2=CR'-CO-OR'' \qquad \text{formula IV}$$

whereby R' is selected from the group of H, methyl, ethyl and whereby R" is a C10-C30 alkyl group,
the copolymers preferably being cross-linked with a cross linking agent which preferably is a polyfunctional monomer having at least two terminal vinyl $CH_2=C$ groups.

In this embodiment, R" in formula IV is preferably a C10-C20 alkyl group.

In another embodiment of the present invention, the carbomer has an average molecular weight Mn in the range of 20,000 to 5,000,000, as measured by Gel Permeation Chromatography (GPC).

By preference, the carbomer according to the present invention is itself cross-linked, and preferably the cross linking agent of the carbomer is allylpentaerythritol.

In yet another embodiment, the carbomer in the composition according to the present invention is itself a pseudoplastic material.

When dosing the carbomer into the composition according to the present invention, preferably sufficient carbomer is added in order to clearly observe the properties of a dilatant fluid, or of a non-Newtonian composition.

In another embodiment, there may be selected for an additional dispersant which is selected from the group consisting of carboxymethyl cellulose (CMC), cellulose gum, and xanthan gum.

Of the carbomer dispersants has been shown by the inventor that they may keep boron containing compounds in suspension in a very efficient manner. An additional advantage associated with the use of this kind of dispersants is that the suspension may exhibit thixotropic (non-Newtonian) fluid properties. Thereby the suspension which is moving during transport will flow very easily, while in rest it will exhibit sufficient viscosity to keep the particles of borate salt or boric acid in suspension.

Such a suspension brings the further major advantage that it is very easy to produce. It is possible to add only one carbomer dispersant to the suspension and also to add only a relatively small quantity of the dispersant to keep the boron containing compound in suspension, and thereby no more additional compounds have to be added, such as swellable clay, as additional dispersant optionally in combination with further additional dispersant in order to stabilise the swellable clay.

An additional advantage of the suspension according to the present invention compared to already existing borax suspensions is that the suspension according to the invention is transparent white. This brings major advantages in certain industrial fields such as in the nuclear industry where a turbid or coloured suspension is undesired.

The suspension brings the further advantage that the dispersants have a low reactivity. This is of particular importance when boric acid has to be kept in suspension. Boric acid may be fairly reactive with particular other substances and may therefore for instance react with certain polysaccharides whereby these compounds are not suitable as dispersants to keep boric acid in suspension.

Preferably the carbomer is present in a concentration of at least 5 ppm by weight based on the total suspension and optionally not more than 2.5% by weight, preferably not more than 2.0% by weight, more preferably not more than 1.5% by weight and even more preferably not more than 1.0% by weight on the same basis. More preferably the carbomer is present in at least 50 ppm by weight, more preferably at least 500 ppm by weight, even more preferably at least 750 ppm by weight, yet more preferably at least 900 ppm by weight, more preferably at least 0.1% by weight, preferably at least 0.2% by weight, more preferably at least 0.5% weight, even more preferably at least 1.0% wt, preferably at least 2.0% by weight, and optionally at most 6.0% by weight, preferably not more than 5.0% by weight, more preferably at most 4.0% by weight, whereby the concentration is expressed relative to the weight of the suspension without the quantity of the boron containing compound which is in suspension.

The presence of the carbomer in the composition according to the present invention may be determined by Infra-Red (IR) Spectrometry, and with the development of a suitable calibration curve, this method may be made suitable for a quantitative determination of the amount of carbomer present in the composition. We prefer to use a Perkin Elmer FT-IR Spectrometer Spectrum 100, with a Universal ATR Sampling Accessory.

In an embodiment, the suspension according to the present invention has a pH of at most 13.0, preferably at most 12.5, more preferably at most 12.0, yet more preferably at most 11.5, more preferably at most 11.0, even more preferably at most 10.5, yet more preferably at most 10.0, even more preferably at most 9.5, yet more preferably at most 9.0 or even better at most 8.5, even more preferably at most 8.0, and most preferably at most 7.5, and optionally a pH of at least 4.0, preferably at least 5.0, more preferably at least 6.0, even more preferably at least 6.5 and most preferably at least 6.8. It is important to remember that pH is a logarithmic scale, such that a single unit reduction in pH, such as from 12.5 to 11.5, represents a factor 10 reduction in base concentration, and thus a tenfold reduction in the concentration of caustic soda, which may be used for controlling the pH. This property offers the advantage of a better compatibility with a wider range of construction materials, as well as less risk for possible damage in case of leaks or release of the suspension.

We have found that carboxymethyl cellulose (CMC) or cellulose gum, or xanthan gum may be used together with the carbomer. This compound may contribute by further modifying the viscosity and/or thicken the composition. We have found that CMC may be used in combination with the carbomer, and that a composition according to the present invention containing CMC preferably has a pH of at most 10.0, more preferably at most 9.0, in order to avoid a degradation of the CMC by a strong base such as NaOH.

In another embodiment, the viscosity of the suspension according to the present invention increases strongly when the amount of shear stress applied reduces to low values. As such, the ratio of the viscosity of the composition according to the present invention, as measured on a Brookfield viscosimeter with spindle 3 at 25° C. and expressed in mPa·s or cP, and which is measured at a spindle speed of 1 rpm (low shear) divided by the viscosity measured at a spindle speed of 100 rpm (high shear) is preferably at least 5.00, preferably at least 7.0, more preferably at least 10.0, even more preferably at least 12.0 or even 15.0, even more preferably at least 20.0. The higher this ratio, the larger the difference in behaviour of the suspension between when it is pumped and when it is at rest.

The boron-containing compound may be brought into a suspension by means of the carbomer according to the present invention. Most suitable is to first prepare a gel containing carbomer in water in a concentration in the range of 0.5-6% wt, preferably 1-5% wt and more preferably 2-4% wt, typically using a high shear mixer. Into 1000 kg of this gel may then be suspended a boron-containing compound, such as from 100 to 2000 kg of borax, preferably from 400 to 1800 kg of borax, more preferably from 500 to 1500 kg of borax, even more preferably from 550 to 1000 kg of borax. The boron-containing compound may be added during simple mixing, or may be added during the preparation of the gel in the high shear mixer. Such suspension of a boron containing compound is suitable for use in a series of applications and uses according to the present invention.

In yet another embodiment, the suspension according to the present invention further comprises at least one more ingredients selected from the group consisting of a surface tension agent, an antifoam agent, a descaling agent, an optical clarification agent, a fungicide, a bactericide or anti bacterial agent, a colorant, a wetting agent, a viscosity modifier, a rheology modifier, an antifreeze, a solvent, a filler, and mixtures thereof. These ingredients may be introduced at any point in the process of the present invention, and in any of the occurring fluids.

Preferably the solvent used for the suspension is water. Other solvents, such as methanol, ethanol or any other polar solvent known in the art may also be used.

The present invention may be very useful in applications where it is desirable to add boric acid or borates in a continuous or semi-continuous manner to a mixing process or a reactive environment, more specifically in applications where it is required to measure and control the addition of borate salts or boric acid in a controlled manner and in particular in applications which occur at high humidity. This invention may be advantageous in the detergent industry with the production of detergents or cleaners, in the industrial formulation of liquid fertilizers, in nuclear power plants, for the formulation of pesticides and fungicides, and with the production of glass, fibreglass, plastics and rubbers, in the industrial production of antifreeze compositions, thermal fluids, metal treating coating compositions, insulating and flame retardant compositions, photographical compositions, and applications in the ceramic and wood industry.

In an embodiment whereby the suspension is used for the absorption of neutrons, the suspension is preferably used with the generation of electric power from nuclear energy, preferably in a nuclear reactor provided with a water cycle under pressure or "pressurized water reactor (PWR)".

With the use for the adsorption of neutrons, the use preferably targets an objective or function selected from being a poison for a nuclear reaction, the control or the mastering of a nuclear reaction and the shutdown of a nuclear reaction, for keeping under control used uranium bars, and whereby the nuclear reaction is preferably a nuclear fission reaction.

The present invention is now further illustrated by the following examples, without resulting in that it would be considered limited thereto.

EXAMPLE 1

A non-Newtonian gel was prepared making use of an industrial high shear mixer, whereby a dispersion is creates comprising 0.02% wt of Carbopol 981 from Lubrizol Company in 99.98% water. After about 1 minute of mixing the gel was ready.

Further, 25% m/m (=mass) borax decahydrate in granular form (Technical grade, Granular, from Etimine SA) was mixed into the gel. After two minutes the gel-suspension of granular borax decahydrate was ready and stable.

EXAMPLE 2

Carbomer Gel Preparation

In an IKA magic LAB High Shear Mixer 40 grams of Carbopol 941 powder was mixed into 920 grams of water, and the pH was brought up to 6.8 by introducing 40 grams of NaOH solution of 29% wt strength.

Carbopol 941 may be described as a cross-linked polyacrylic acid polymer, available in powder form. When submitted to Gel Permeation Chromatography (GPC) dissolved in dimethylacetamide (DMA), the Carbopol 941 gave a spectrum showing a broad peak in between a retention window of 21 to almost 32 minutes which provided the following molecular weight information relative to DMA and on an analytical system which is calibrated with polymethylmethacrylate reference standards: an Mn of 96483, an Mw of 163802, resulting in a polydispersity Mw/Mn of 1.70, an MP of 114358 at a retention time of about 26 minutes, an Mz of 263738 and an Mz+1 of 379289.

Suspension Preparation

In 600 liter of the carbomer gel of this example, an amount of 350 kg of borax (decahydrate—same source as above in Example 1) was mixed and a stable suspension of the borax was obtained. A similar stable borax suspension was obtained when mixing 10 kg of Carbopol 674 in 1000 liter of water using high shear mixing, followed by adding 1500 kg of borax under stirring.

EXAMPLE 3

Preparation of Boric Acid Suspensions

Use was made of granular boric acid with 99.90% wt purity, obtained under the trade name ENTIMADEN® from the company ETIMIN. This granular product contained at most 2.00% wt of particles which are retained on a sieve with 1.000 mm as opening, and only at most 4.00% wt of particles which pass through a sieve having 0.063 mm as opening.

First twice an identical gel was prepared by each time mixing under high shear mixing conditions 10 kg of Carbopol 674 from Lubrizol into 1000 kg of water. Subsequently, suspensions A and B were prepared by mixing respectively 500 kg and 1000 kg of granular boric acid into the respective gels. The percentages of solid matter amounted respectively to 20.10% and 30.50% weight. The pH of the suspensions was not adjusted and was respectively 3.4 and 3.7.

The viscosities of both suspensions were measured with a Brookfield RV viscosimeter with spindle 3, and this at various rotation speeds. The results are represented in Table 1, and are graphically shown in the figure. All results are expressed in centiPoise (mPa·s, and the rotational speeds in rotations per minute (rpm).

TABLE 1

| | rpm | | | | | |
|---|---|---|---|---|---|---|
| | 1 | 5 | 25 | 50 | 75 | 100 |
| A | 18300 | 5100 | 1600 | 1000 | 850 | 700 |
| B | 21500 | 6500 | 2200 | 1400 | 1100 | 950 |

The change of viscosity in function of the rotational speed of the spindle clearly shows the non-Newtonian behaviour of both suspensions, more particularly how the viscosity is relatively high at low shear rate and much lower at high shear rates.

The advantage of this particular fluid behaviour of the suspension is that a conventional pump is able to pump them, such as for the preparation of more dilute suspensions.

Having now fully described this invention, it will be appreciated by those skilled in the art that the invention can be performed within a wide range of parameters within what is claimed, without departing from the spirit and scope of the invention. As understood by those of skill in the art, the overall invention, as defined by the claims, encompasses other preferred embodiments not specifically enumerated herein.

The invention claimed is:

1. A suspension of a boron containing compound in water, wherein the suspension comprises a carbomer, whereby the carbomer comprises at least one homopolymer of an α,β-unsaturated monocarboxylic acrylic acid having 3-5 carbon atoms, which corresponds to formula III $$CH_2=CR-COOH \qquad \text{formula III}$$

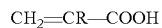

in which R represents a sub stituent selected from the group of H, monovalent alkyl, aryl or alkylaryl residues and monovalent cycloalkyl residues, or whereby the carbomer comprises at least one a copolymer, whereby the acrylic acid of the formula III is copolymerized with at least one alkylacrylate having formula IV:

$$CH_2=CR'-CO-OR'' \qquad \text{formula IV}$$

whereby R' is selected from the group consisting of H, methyl, ethyl and R'' is a C10-C30 alkyl group, the carbomer has a molecular weight (Mw) in the range of 50,000 to 5,000,000 and is cross-linked, and the carbomer is present in a concentration of at least 50 ppm by weight and whereby the boron containing compound is selected from the group consisting of boric acid, a sodium or potassium polyborate, in its hydrate or non-hydrate form and whereby the boron containing compound is present as a granulate of which at most 4.00% wt of the particles pass through a sieve with openings of 0.063 mm and at most 10.00% wt is retained in a sieve with openings of 1.000 mm.

2. The suspension according to claim 1, wherein the boron containing compound is selected from the group consisting of a sodium tetraborate, a pentaborate, an octaborate, and mixtures thereof.

3. The suspension according to claim 1, wherein the boron containing compound is selected from the group consisting of sodium tetraborate decahydrate or borax, kernite and mixtures thereof.

4. The suspension according to claim 1, which further comprises an additional dispersant which is selected from the group consisting of carboxymethyl cellulose (CMC), cellulose gum and xanthan gum, and mixtures thereof.

5. The suspension according to claim 1, whereby the carbomer is present in a concentration of at least 500 ppm by weight.

6. The suspension according to claim 1, whereby the carbomer is present in a concentration of at least 750 ppm by weight.

7. The suspension according to claim 1, whereby the carbomer is present in a concentration of at least 900 ppm by weight.

8. The suspension according to claim 1, whereby the carbomer is present in a concentration of at least 0.1% by weight.

9. The suspension according to claim 1, whereby the carbomer is present in a concentration of at least 0.2% by weight.

10. The suspension according to claim 1, whereby the carbomer is present in a concentration of at least 0.5% by weight.

11. The suspension according to claim 1, whereby the carbomer is present in a concentration of at least 1.0% by weight.

12. The suspension according to claim 1, whereby the carbomer is present in a concentration of at least 2.0% by weight.

13. The suspension according to claim 1, whereby the carbomer is present in a concentration of at most 6.0% by weight, whereby the concentration is expressed relative to the weight of the suspension without the quantity of the boron containing compound which is in suspension.

14. The suspension according to claim 13, whereby the carbomer is present in a concentration of not more than 5.0% by weight.

15. The suspension according to claim 13, whereby the carbomer is present in a concentration of at most 4.0% by weight.

16. The suspension according to claim 1, whereof the pH is at most 13.0.

17. The suspension according to claim 1, whereof the pH is at most 12.0.

18. The suspension according to claim 1, whereof the pH is at most 11.0.

19. The suspension according to claim 1, whereof the pH is at most 10.0.

20. The suspension according to claim 1, whereof the pH is at most 9.0.

21. The suspension according to claim 1, whereof the pH is at most 8.0.

22. The suspension according to claim 1, further comprising at least one ingredient selected from the group consisting of a surface tension agent, an antifoam agent, a corrosion inhibitor, a descaling agent, an optical clarification agent, a fungicide, a bactericide or anti bacterial agent, a colorant, a wetting agent, a viscosity modifier, a rheology modifier, an antifreeze, a solvent, a filler, and mixtures thereof.

23. A suspension of a boron containing compound in water, wherein the suspension comprises a carbomer, whereby the carbomer comprises at least one homopolymer of an α,β-unsaturated monocarboxylic acrylic acid having 3-5 carbon atoms, which corresponds to formula III $$CH_2=CR-COOH \qquad \text{formula III}$$

in which R represents a sub substituent selected from the group of H, monovalent alkyl, aryl or alkylaryl residues and monovalent cycloalkyl residues, or whereby the carbomer comprises at least one a copolymer, whereby the acrylic acid of the formula III is copolymerized with at least one alkylacrylate having formula IV:

$$CH_2=CR'-CO-OR'' \qquad \text{formula IV}$$

whereby R' is selected from the group consisting of H, methyl, ethyl and R" is a C10-C30 alkyl group, the carbomer has a molecular weight (Mw) in the range of 50,000 to 5,000,000 and is cross-linked, and the carbomer is present in a concentration of at least 50 ppm by weight, and whereby the suspension is obtainable a) by mixing the boron containing compound into a solution of the carbomer in the water, or b) by adding the carbomer into a suspension of the boron containing compound in the water, whereby the boron containing compound is selected from the group consisting of boric acid, a sodium or potassium polyborate, in its hydrate or non-hydrate form and whereby the boron containing compound is present as a granulate having a particle size distribution which by sieving shows at most 4.00% wt of particles passing through a sieve with openings of 0.063 mm and at most 10.00% wt is retained in a sieve with openings of 1.000 mm.

24. The suspension according to claim 23 wherein the carbomer is added in step b) under high shear mixing conditions.

* * * * *